US010800703B1

(12) United States Patent
Eichler et al.

(10) Patent No.: US 10,800,703 B1
(45) Date of Patent: Oct. 13, 2020

(54) CEMENTITIOUS MATERIAL

(71) Applicant: Government of the United States, as represented by the Secretary of the Air Force, Wright-Patterson AFB, OH (US)

(72) Inventors: Jeffery Eichler, Valdosta, GA (US); Kara Griffith, Lynn Haven, FL (US); Derek Lovingood, Panama City, FL (US); Michael Henley, Panama City, FL (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 186 days.

(21) Appl. No.: 16/172,043

(22) Filed: Oct. 26, 2018

(51) Int. Cl.
*C04B 28/02* (2006.01)
*C04B 22/06* (2006.01)
*C04B 14/06* (2006.01)
*C04B 40/00* (2006.01)
*C04B 14/10* (2006.01)
*C04B 103/12* (2006.01)

(52) U.S. Cl.
CPC .......... *C04B 28/021* (2013.01); *C04B 14/06* (2013.01); *C04B 14/10* (2013.01); *C04B 22/062* (2013.01); *C04B 40/0032* (2013.01); *C04B 40/0046* (2013.01); *C04B 2103/12* (2013.01)

(58) Field of Classification Search
CPC ....... C04B 14/06; C04B 14/10; C04B 22/062; C04B 28/021; C04B 40/0032; C04B 40/0046; C04B 2103/12
See application file for complete search history.

(56) References Cited

U.S. PATENT DOCUMENTS

| 4,227,932 | A | 10/1980 | Leah et al. |
| 5,435,843 | A | 7/1995 | Roy et al. |
| 7,794,537 | B2 | 9/2010 | Barlet-Gouedard et al. |
| 9,290,416 | B1 | 3/2016 | Allouche et al. |
| 9,919,974 | B2 | 3/2018 | Gong et al. |
| 2011/0132230 | A1 | 6/2011 | Han et al. |
| 2017/0144933 | A1* | 5/2017 | Allouche .............. C04B 28/006 |
| 2017/0166481 | A1* | 6/2017 | Dubey .................... E01C 23/10 |

FOREIGN PATENT DOCUMENTS

| CN | 107777981 A * | 3/2018 |
| WO | 2012160319 | 11/2012 |
| WO | 2017040308 | 3/2017 |

OTHER PUBLICATIONS

Rao et al "Final Setting Time and Compressive Strength of Fly Ash and GGBS-Based Geopolymer Paste and Mortar", Arab J Sci Eng 40:3067-3074 (Year: 2015).*
Adam et al "The Effect of Lime Addition on the Setting Time and Strength of Ambient Cured Fly Ash Based Geopolymer Binder", MATEC Web of Conferences 47, 01015 (Year: 2016).*
B. Singh, Ishwarya G., M. Gupta, S.K. Bhattacharyya, Geopolymer Concrete: A Review of Some Recent Developments; Constuction and Building Materials 85 (78-90) Elsevier; 2015.
Gang Xu, Jing Zhong, Xianming Shi; Influence of Graphene Oxide in a Chemically Activated Fly Ash, Fuel (226) 644-657 Elsevier; 2018.
Gang Xu, P.E., S.M.ASCE and Cianming Shi , Ph.D., P.E., M.ASCE; Exploratory Investigation into a Chemically Activated Fly Ash Binder for Mortars; J. Mater, Civ. Eng, 2017, 29(11): 06017018.
Tomasz Blaszczynski, Maciej Krol, Geopolymers in Construction, Article in Civil and Environmental Engineering Reports, Mar. 2015.
Xiaolu Guo, Huisheng Shi, Warren A. Dick, Compressive Strength and Microstructural Characteristics of Class C Fly Ash Geopolymer, Cement and Concrete Composites 32 (142-147), Elsevier, 2010.

* cited by examiner

*Primary Examiner* — Anthony J Green
(74) *Attorney, Agent, or Firm* — AFMCLO/JAZ; David E. Franklin

(57) ABSTRACT

A rapid-setting composition includes fly ash and an activator solution for mixing with the fly ash. The activator solution has a silicate solution including a monovalent hydroxide. The activator solution when mixed with the fly ash produces a composition that has a final set time of no more than about 65 minutes.

5 Claims, 5 Drawing Sheets

US 10,800,703 B1

CEMENTITIOUS MATERIAL

GOVERNMENT INTEREST

The invention described herein may be manufactured and used by or for the Government of the United States for all governmental purposes without the payment of any royalty.

CROSS REFERENCE TO RELATED APPLICATIONS

There are no related applications.

FIELD OF THE INVENTION

This invention relates to the field of cementitious materials. More particularly, this invention relates to rapid-setting cementitious compositions and methods for producing the same utilizing fly ash and an activator solution for mixing with the fly ash including a silicate solution having a monovalent hydroxide.

BACKGROUND OF THE INVENTION

There is a need in the art for rapid-setting cementitious compositions. In one use, such compositions are useful to enable rapid deployment and installation of pavement or like fill materials using relatively small quantities of commercial products combined with indigenous or locally sourced materials. Such a need is particularly desirable in circumstances requiring rapid repair of roads, runways and the like in the event of natural disasters such as hurricanes or earthquakes.

The present invention advantageously provides rapid-setting cementitious materials and methods for producing the same utilizing fly ash and an activator solution for mixing with the fly ash including a silicate solution having a monovalent hydroxide.

These materials and methods are combinable with in-situ and on-site indigenous or locally sourced materials (e.g., sand, soil, clay, gravel) to facilitate rapid repair of roads, runways and the like while minimizing transport of materials and associated costs and logistics.

SUMMARY OF THE INVENTION

The above and other needs are met by rapid-setting cementitious materials and methods for producing the same.

In one aspect, the invention provides a rapid-setting composition that includes fly ash and an activator solution for mixing with the fly ash. The activator solution has a silicate solution including a monovalent hydroxide. The activator solution when mixed with the fly ash produces a composition that has a final set time of no more than about 65 minutes.

In another aspect, the invention provides a method of providing a rapid-setting cementitious composition. The method includes the steps of providing a quantity of fly ash; providing an activator solution including a silicate solution having a monovalent hydroxide; and mixing the activator solution with the fly ash to provide a rapid-setting cementitious composition that has a final set time of no more than about 65 minutes.

In a further aspect, the invention provides a method of providing a rapid-setting cementitious composition of adjustable set time. The method includes the steps of providing an amount of fly ash; providing an activator solution having a silicate solution including a monovalent hydroxide having a molarity; and providing an amount of inert material including sand, soil, clay, gravel and combinations thereof. The amount of the inert material is selected relative to the amount of fly ash to provide a ratio of the inert material to the fly ash;

Further steps include mixing the activator solution with the fly ash and the inert material to provide a rapid-setting cementitious composition that has a final set time that ranges from about 5 minutes to about 65 minutes; and adjusting the molarity of the monovalent hydroxide in the activator solution or the ratio of the inert material to the fly ash or both the molarity of the monovalent hydroxide in the activator solution and the ratio of the inert material to the fly ash to provide a desired final set time within the range.

The desired final set time is determined by the molarity of the monovalent hydroxide in the activator solution or the ratio of the inert material to the fly ash or both the molarity of the monovalent hydroxide in the activator solution and the ratio of the inert material to the fly ash.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION OF THE INVENTION

Figure 1:
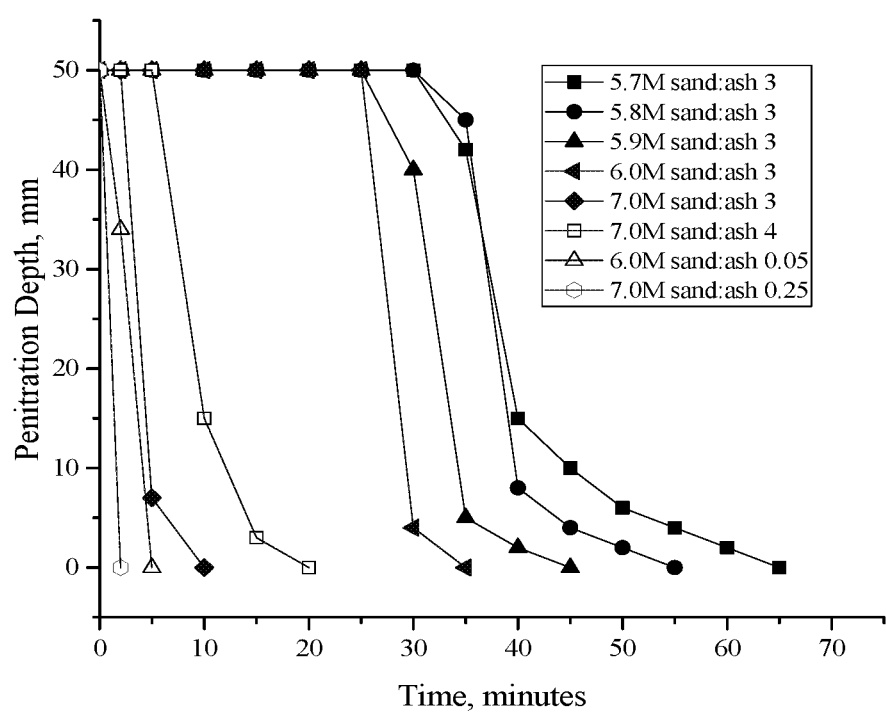
FIG. 1 is a graph of set times of cementitious materials according to the disclosure as a function of monovalent hydroxide molar concentration in an activator solution and ratio of sand to Class C fly ash.

The invention advantageously provides rapid-setting cementitious materials and methods for producing rapid-setting cementitious materials. Rapid-setting compositions according to the disclosure include fly ash and an activator solution for mixing with the fly ash. Inert materials such as sand, soil, clay, gravel and combinations thereof may be additionally included.

Fly ash is available as a waste material collected from flue gasses in the burning of coal, typically at electrical power plants. Fly ash is composed of amorphous and crystalline forms of silicates and aluminates. One type of fly ash, known as Class C fly ash or CFA, is defined by ASTM C618 as a specific classification of fly ash containing high concentrations of calcium, usually greater than 20%. Class C fly ash is a preferred fly ash for use in rapid-setting cementitious materials of the invention.

The activator solution according to the disclosure that is mixed with the fly ash has a silicate solution including a monovalent hydroxide. The silicate solution may be provided by commercial silicate solutions or by mixing water soluble silicate powder with water. The silicate solution may be a potassium silicate solution or a sodium silicate solution. A potassium silicate solution is preferred.

A preferred sodium silicate solution is available from PQ Corporation of Valley Forge, Pa., under the tradename N sodium silicate solution. Preferred potassium silicate powders are hydrous potassium silicate powders available from PQ Corporation under the tradename KASOLV. A particularly preferred potassium silicate powder is KASOLV 16 potassium silicate powder available from PQ Corporation.

Monovalent hydroxides can be added to the silicate solution according to the disclosure so as to provide the activator solution. Suitable monovalent hydroxides can include the Group I alkali metal hydroxides, potassium hydroxide, sodium hydroxide, cesium hydroxide, or lithium hydroxide. Potassium hydroxide and sodium hydroxide are preferred. The silicate solution preferably has a molar concentration of from about 5.5 M to about 8.0 M.

The activator solution when mixed with the fly ash including any inert materials such as sand, soil, clay, gravel, if present produces a rapid-setting composition that has a final set time of no more than about 65 minutes. Further, within 24 hours after the activator solution has been mixed with the fly ash to provide the rapid-setting composition, the composition has a compressive strength of at least about 550 psi.

Rapid-setting cementitious compositions according to the invention may also be tailored to meet specific materials specifications. For example, it has been observed the compressive strength and/or the final set time of the cementitious compositions may be obtained by adjusting the (1) molarity of the monovalent hydroxide in the activator solution or (2) the ratio of the inert material to the fly ash or (3) both.

To illustrate the invention, various exemplary rapid-setting compositions were prepared as set forth in Table 1 below. Final set times and compressive strengths of the cementitious compositions were determined and are set forth in Table 1 below, and also shown in graph form in FIGS. 1-5. The results demonstrated final set times of from about 1 to about 65 minutes and compressive strengths of at least about 550 psi at 24 hours, as explained below.

The activator solutions were prepared by dissolving monovalent (potassium) hydroxide and dry potassium silicate in water in the proportions shown in Table 1. In each case, the activator solution was mixed for about 24 hours to allow sufficient time for complete dissolution and to allow the activator solution to cool to ambient temperature, which was maintained to be 23.6° C. In some experiments, the temperature of the activator solution was adjusted from ambient temperature by either warming on a hot plate to the desired temperature (45, 52 or 60° C.) or cooling in a refrigerator to 4.5° C.

To prepare the rapid-setting cementitious compositions of Table 1, the activator solution was added to a mixture of inert material of sand or sand/gravel conforming to ASTM C33 specification and Class C fly ash conforming to ASTM C618 to provide a rapid-setting composition. Each rapid-setting composition was mixed for 20 seconds then poured in triplicate into 8 inch$^3$ cube molds and vibrated to remove air bubbles. Set times were measured following ASTM method C191 with an ELE International Vicat apparatus, Model 38-2012 CT-1A. Each rapid-setting composition was allowed to cure at ambient temperature for 24 hours then demolded and its unconfined compressive strength measured using an ELE International ACCU-TEK 250 compression tester in accordance with ASTM method C39.

A series of compositions were prepared which demonstrate the ability to tailor final set times of the rapid-setting compositions from about 10 min to about 65 min by adjusting only the monovalent hydroxide molarity in the activator solution. The rapid-setting compositions prepared in this regard are shown by the solid symbols in FIG. 1. For each such rapid-setting composition, a final set time was achieved when the Vicat apparatus needle could no longer penetrate the composition; i.e. penetration depth was zero.

Additional compositions were prepared which demonstrate that even faster set times may be achieved by altering the sand to fly ash ratio as shown by the open symbols in FIG. 1. Accordingly, from the results shown in FIG. 1, it will be appreciated that the final set time may be adjusted according to the disclosure to range from about 3 min to about 65 min.

Figure 2:
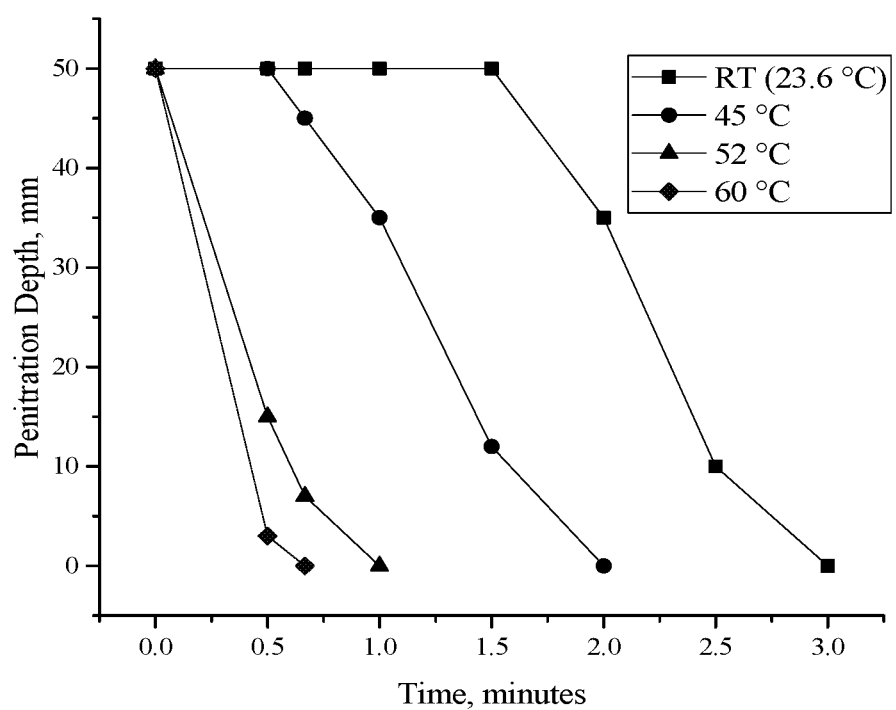
FIG. 2 is a graph showing the effect of activator solution temperature on set times of cementitious materials according to the disclosure.

The effect of activator solution temperature on a very rapid-setting composition is shown in FIG. 2. At these very rapid set times, increasing the activator solution temperature to 60° C. was observed to decrease the final set time by more than 67%. Also, a reduction in the ambient temperature reduced the final set time from about 3 min to less than 1 min.

Figure 3:
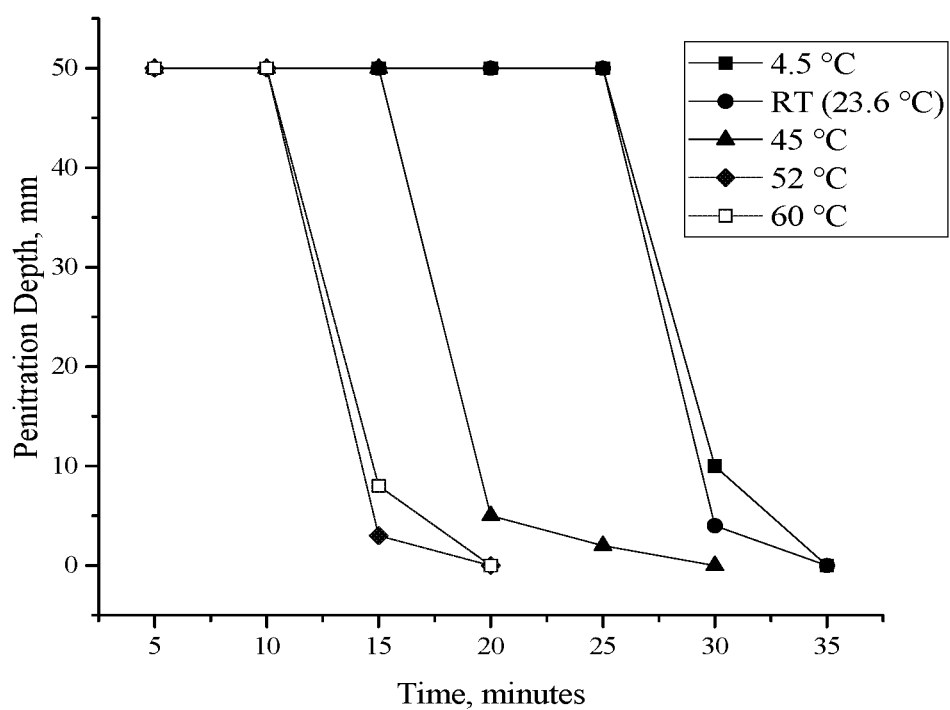
FIG. 3 is a graph showing the effect of activator solution temperature on set times of alternate embodiments of cementitious materials according to the disclosure.

The effect of activator solution temperature on a less reactive rapid-setting composition is shown in FIG. 3. Increasing the activator solution temperature in this composition's preparation also decreased the final set time. As shown, the final set time decreased by about 43%, and the set time decreased from about 35 min at ambient temperature to about 20 min at temperatures above about 52° C.

Altering the temperature of the activator solution between about 4.5° C. and 60° C. was observed to enable adjustment of the set times of the rapid-setting cementitious materials up to a maximum of about 43-70% from the ambient-temperature activator solution set times. Final set times were adjusted by about 2 min to 15 min within the temperature range studied as shown in FIGS. 2 and 3. As may be observed from FIG. 2, the compositions may be selectively prepared to have a final set time of from about 1 min to about 65 min.

Figure 4:
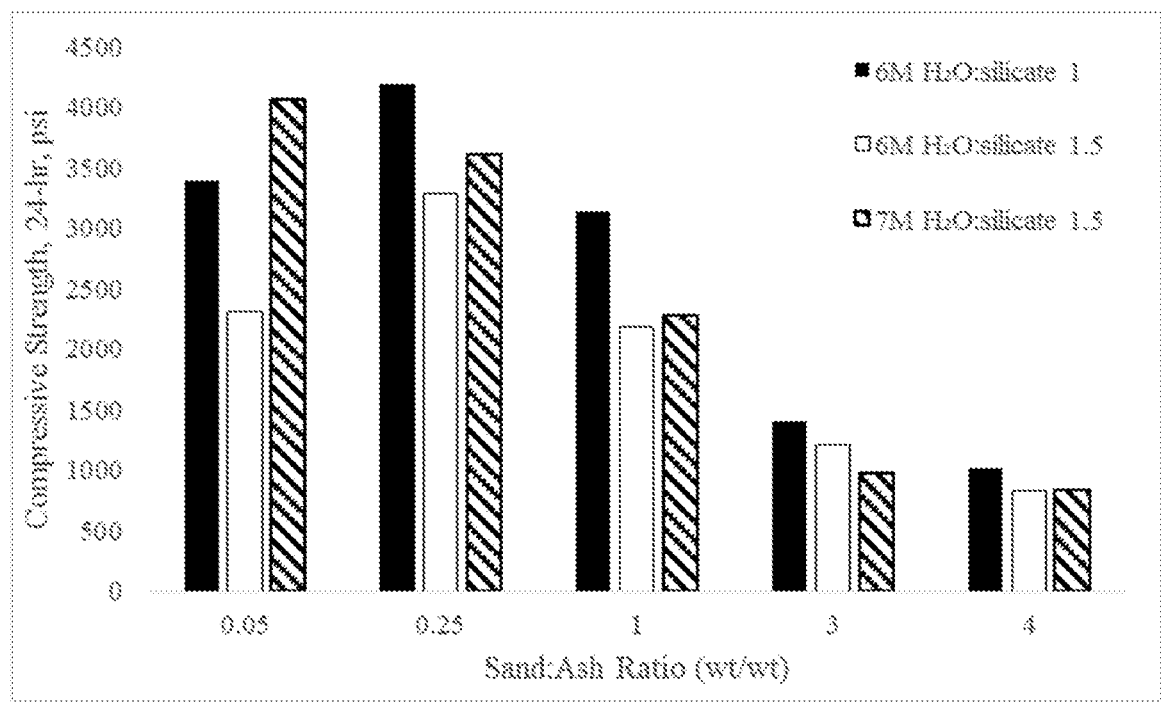
FIG. 4 is a graph showing the effect of inert material content on the compressive strength of cementitious materials according to the disclosure.

The unconfined compressive strengths of rapid-setting cementitious compositions prepared according to the disclosure were observed to vary over a range from about 825 psi to about 4200 psi based on the proportions of inert material and Class C fly ash as shown in FIG. 4.

For the compositions of FIG. 4, the weight ratio of inert material, i.e. sand, to fly ash was varied from 0.05 to 4. The compressive strength of the compositions shown in FIG. 4 increased from about 825 psi at a sand to fly ash weight ratio of 4 to as much as about 4200 psi with a sand to fly ash weight ratio of 0.25. Accordingly, as demonstrated by the compositions of FIG. 4 the compressive strength of the rapid-setting compositions may be adjusted by adjusting the proportions of the inert material and the Class C fly ash.

Figure 5:
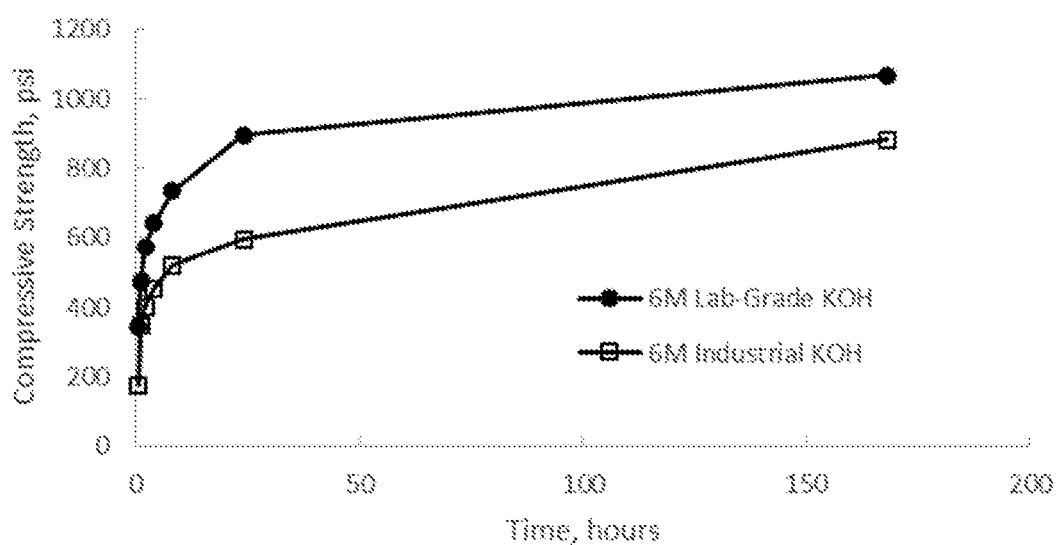
FIG. 5 is a graph showing the effect of a potassium hydroxide source on compressive strength development of cementitious materials according to the disclosure.

A comparison of rapid-setting compositions in which the sole difference was the source of the potassium hydroxide used to prepare the activator solution is shown in FIG. 5. For these compositions, the activator solution was at ambient temperature with the weight ratio of water to activator solution selected to be 1.5 and a sand to Class C fly weight ratio selected to be 3.0.

As shown in FIG. 5, a composition prepared with laboratory-grade potassium hydroxide (6M Lab-Grade KOH) resulted in a 24-hr compressive strength of 894.8 psi. A composition prepared in the same manner but using industrial-grade potassium hydroxide (6M Industrial KOH) had a compressive strength of 594.7 psi. It has been observed that variations in source materials can affect the set time and it is believed that such variations would result in lower compressive strengths of about 550 psi at 24 hours.

TABLE 1

| Activator Solution | | | Solid Components | | | | |
|---|---|---|---|---|---|---|---|
| | | | Inert: Fly Ash | | Solids: Activator | | Compressive |
| Hydroxide Molarity | H$_2$O:Silicate Ratio (wt/wt) | Temp, °C. | Ratio (wt/wt) | Inert Material | Ratio (wt/wt) | Set Time, Final, min | Strength, 24-hr, psi |
| 5.7 | 1.5 | RT[1] | 3 | sand | 4.9 | 65 | 994.2 |
| 5.8 | 1.5 | RT | 3 | sand | 4.9 | 55 | 1014.7 |
| 5.9 | 1.5 | RT | 3 | sand | 4.9 | 45 | 1050.8 |
| 6 | 1 | RT | 2.3 | sand|gravel[2] | 4.9 | 10 | 2434.5 |
| 6 | 1 | RT | 0.05 | sand | 2.5 | 5 | 3391.7 |
| 6 | 1 | RT | 0.25 | sand | 3.5 | 15 | 4197.6 |
| 6 | 1 | RT | 1 | sand | 3.8 | 20 | 3140.3 |
| 6 | 1 | 45 | 1 | sand | 3.8 | 10 | 3157.7 |
| 6 | 1 | 52 | 1 | sand | 3.8 | 10 | 3124.5 |
| 6 | 1 | 60 | 1 | sand | 3.8 | 10 | 3349.1 |
| 6 | 1 | RT | 3 | sand | 4.5 | 40 | 1409.5 |
| 6 | 1 | RT | 4 | sand | 4.5 | 40 | 1019.0 |
| 6 | 1.5 | RT | 0.05 | sand | 3 | 5 | 2310.8 |
| 6 | 1.5 | RT | 0.25 | sand | 3.6 | 10 | 3283.4 |
| 6 | 1.5 | RT | 1 | sand | 4.3 | 15 | 2183.0 |
| 6 | 1.5 | RT | 3 | sand | 4.9 | 35 | 1211.4 |
| 6 | 1.5 | 4.5 | 3 | sand | 4.9 | 35 | NA[3] |
| 6 | 1.5 | 45 | 3 | sand, | 4.9 | 30 | 1123.7 |
| 6 | 1.5 | 52 | 3 | sand | 4.9 | 20 | 1175.2 |
| 6 | 1.5 | 60 | 3 | sand | 4.9 | 20 | 1104.1 |
| 6 | 1.5 | RT | 4 | sand | 4.9 | 35 | 825.9 |
| 6 | 1.5 | RT | 3 | clay | 3.5 | 35 | 1638.4 |
| 7 | 1.5 | RT | 3 | clay | 3.7 | 6 | 1614.7 |
| 7 | 1.5 | RT | 1 | clay | 3.75 | 2 | 3012.7 |
| 7 | 1.5 | RT | 0.05 | sand | 2.5 | 3 | 3610.8 |
| 7 | 1.5 | RT | 0.25 | sand | 3.3 | 3 | 3607.8 |
| 7 | 1.5 | 45 | 0.25 | sand | 3.3 | 2 | 3320.4 |
| 7 | 1.5 | 52 | 0.25 | sand | 3.3 | 1 | 3301.5 |
| 7 | 1.5 | 60 | 0.25 | sand | 3.3 | 0.67 | NA[3] |
| 7 | 1.5 | RT | 1 | sand | 4.3 | 4 | 2277.5 |
| 7 | 1.5 | RT | 3 | sand | 4.8 | 10 | 976.3 |
| 7 | 1.5 | RT | 4 | sand | 4.3 | 20 | 833.3 |
| 7 | 1.5 | 45 | 4 | sand | 4.3 | 10 | 883.8 |
| 7 | 1.5 | 52 | 4 | sand | 4.3 | 110 | 951.2 |

[1] RT = ambient temperature, 23.6 °C.
[2] sand to gravel weight ratio = 1.22
[3] NA = 24-hr data point not available The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

We claim:

1. A method of providing a rapid-setting cementitious composition of adjustable set time, comprising the steps of:
   providing an amount of fly ash;
   providing an activator solution comprising a silicate solution including a monovalent hydroxide having a molarity;
   adjusting the temperature of the activator solution to a temperature of from about 4.5° C. to about 60° C.;
   providing an amount of inert material comprising sand, soil, clay, gravel and combinations thereof, the amount of the inert material being selected relative to the amount of fly ash to provide a ratio of the inert material to the fly ash;
   mixing the activator solution with the fly ash and the inert material to provide a rapid-setting cementitious composition that has a final set time that ranges from about 5 minutes to about 65 minutes; and
   adjusting the molarity of the monovalent hydroxide in the activator solution or the ratio of the inert material to the fly ash or both the molarity of the monovalent hydroxide in the activator solution and the ratio of the inert material to the fly ash to provide a final set time within the range, wherein the final set time is determined by the molarity of the monovalent hydroxide in the activator solution or the ratio of the inert material to the fly ash or both the molarity of the monovalent hydroxide in the activator solution and the ratio of the inert material to the fly ash, wherein the final set time varies further within the range based on the temperature of the activator solution.

2. The method of claim 1, wherein the fly ash comprises Class C fly ash and the silicate solution comprises a potassium silicate solution or a sodium silicate solution.

3. The method of claim 1, wherein the monovalent hydroxide comprises Group I alkali metal hydroxides, potassium hydroxide, sodium hydroxide, cesium hydroxide, or lithium hydroxide.

4. The method of claim 1, wherein the ratio of the inert material to the fly ash ranges from about 0.05 to about 4 by weight.

5. The method of claim 1, wherein the monovalent hydroxide has a molar concentration that is adjusted between about 5.5 M to about 8.0 M to vary the final set time.

\* \* \* \* \*